United States Patent
Niazi et al.

(10) Patent No.: US 7,609,658 B2
(45) Date of Patent: Oct. 27, 2009

(54) METHOD AND SYSTEM FOR IDENTIFYING INSTABILITY OR A SPANNING TREE PROTOCOL LOOP IN A NETWORK

(75) Inventors: Muhammad Sarosh Niazi, San Jose, CA (US); Muhammad Moizuddin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 11/498,599

(22) Filed: Aug. 3, 2006

(65) Prior Publication Data

US 2008/0031154 A1 Feb. 7, 2008

(51) Int. Cl.
*H04L 12/28* (2006.01)
*H04L 12/56* (2006.01)
*G06F 15/177* (2006.01)
*G06F 15/16* (2006.01)

(52) U.S. Cl. .................. 370/256; 370/351; 370/401; 370/408; 709/221; 709/249

(58) Field of Classification Search .............. 370/254
See application file for complete search history.

(56) References Cited

U.S. PATENT DOCUMENTS

| 5,321,812 | A * | 6/1994 | Benedict et al. | 709/223 |
| 7,379,426 | B2 * | 5/2008 | Sekiguchi | 370/241 |
| 2006/0013141 | A1 * | 1/2006 | Mutoh et al. | 370/241 |
| 2006/0045091 | A1 * | 3/2006 | Hata | 370/392 |

OTHER PUBLICATIONS

IEEE 802.1D-2004, IEEE Standard for Local and Metropolitan Area Networks, Media Access Control (MAC) Bridges, Jun. 9, 2004.

* cited by examiner

*Primary Examiner*—Daniel J Ryman
*Assistant Examiner*—Cassandra Decker
(74) *Attorney, Agent, or Firm*—Cindy Kaplan

(57) ABSTRACT

Methods and systems for identifying instability or a loop in a network. In one method, a first BPDU message is received at a switch indicating a topology change. The message includes a bridge identifier identifying a network device originating the first BPDU message. A second BPDU is generated at the switch and includes the bridge identifier identifying the network device originating the first BPDU message. The method further includes transmitting the second BPDU message indicating the topology change from the switch.

22 Claims, 6 Drawing Sheets

METHOD AND SYSTEM FOR IDENTIFYING INSTABILITY OR A SPANNING TREE PROTOCOL LOOP IN A NETWORK

BACKGROUND OF THE INVENTION

Spanning Tree Protocol (STP) is a Layer 2 protocol designed to run on bridges and switches. The spanning tree is a reduction of the layer 2 network mesh constructed such that packets may be forwarded across the network without any looping. The STP specification is defined in IEEE 802.1D and RSTP (Rapid Spanning Tree Protocol) is defined in IEEE 802.1w (incorporated into IEEE 802.1D-2004). The main goal of STP is to make sure that a loop situation does not occur when there are redundant paths in a network. STP accomplishes this by disabling network loops and providing backup links between switches or bridges. STP allows devices to interact with other STP compliant devices in the network to ensure that only one path exists between any two stations on the network. If STP or a similar protocol is not present in a redundant topology network, switches may endlessly flood broadcast packets to all ports (i.e., broadcast storm). When multiple copies of a frame arrive at different ports of a switch, MAC entry instability in a filtering database may occur.

In order to obtain information necessary to run the spanning tree protocol, bridges exchange special messages called Bridge Protocol Data Unit (BPDU) messages. The Spanning Tree Algorithm (STA) determines the role of a port based on BPDUs. The port receiving the best BPDU on a bridge is the root port. This is the port that is closest to the root bridge in terms of path cost. STP uses two different BPDUs; Configuration BPDUs and Topology Change BPDUs (TCN BPDUs). Configuration BPDUs originate from the root bridge every hello time and carry all information required to calculate spanning tree topology. In normal STP operation, a bridge continues to receive Configuration BPDUs from the root bridge. When a bridge needs to signal a topology change, it sends TCNs on its root port. The designated bridge receives the TCN, acknowledges it, and generates another TCN for its own root port. The designated bridge acknowledges the TCN by sending back a Configuration BPDU with the Topology Change Acknowledgement (TCA) bit set. This process continues until the TCN hits the root bridge. Once the root is aware that there has been a topology change event in the network, it starts to send out Configuration BPDUs with the topology change (TC) bit set. These BPDUs are relayed by every bridge in the network with this bit set. As a result all bridges become aware of the topology change.

RSTP is an improved and faster version of STP. RSTP uses only one type of BPDU, referred to as RSTP BPDU. The RSTP BPDU is similar to STP Configuration BPDUs with the exception of a type field set to "version 2" for RSTP and "version 0" for STP, and a flag field carrying additional information. RSTP bridges send information to each other in configuration messages to select a root bridge and the shortest path to it from each LAN (Local Area Network) and each of the other bridges. The information sent for this purpose is known as a spanning tree priority vector. Each priority vector includes: root bridge identifier (of the bridge believed to be the root by the transmitter); root path cost (to root bridge from transmitting bridge); bridge identifier (of the transmitting bridge); port identifier of port through which message was transmitted; and port identifier of port through which message was received (where relevant). With RSTP, every switch that detects a topology change sends BPDUs with the topology change (TC) flag set. When a bridge receives a BPDU with the TC bit set, it sends out BPDUs with the TC bit set on all of its designated ports and root port.

In any switching network there is a possibility of spanning tree loops or instability due to flapping interfaces/hosts or other problems. Troubleshooting STP loops or any instability is a very time consuming process and significantly increases Mean Time to Repair (MTTR). One method for troubleshooting STP loops is to see if TCNs are rapidly increasing on a switch. The use of TCNs is one way of detecting a loop or system instability, but this does not help to isolate the problem.

There is, therefore, a need for a method and system for identifying the network device that is a source of a STP loop or instability using a Spanning Tree Protocol.

SUMMARY OF THE INVENTION

A method and system for identifying instability or a loop in a network are disclosed. In one aspect, a method includes receiving at a switch, a first bridge protocol data unit (BPDU) message indicating a topology change. The message includes a bridge identifier identifying a network device originating the first BPDU message. The switch generates a second BPDU message which includes the bridge identifier identifying the network device originating the first BPDU message. The method further includes transmitting from the switch the second BPDU message indicating the topology change.

In another aspect, a method for identifying instability or a loop in a network generally comprises receiving at a root bridge a plurality of BPDU messages each indicating a topology change and comprising a bridge identifier identifying a network device originating a BPDU message upon detection of a topology change. At least a portion of the BPDU messages comprise the same bridge identifier. The method further includes identifying a source of the instability or loop by identifying the network device associated with the bridge identifier contained in a majority of the BPDU messages received at the root bridge.

In yet another aspect, an apparatus generally comprises a processor operable to process at a root bridge a plurality of BPDU messages each indicating a topology change and comprising a bridge identifier identifying a network device originating a BPDU message upon detection of a topology change. At least a portion of the BPDU messages comprise the same bridge identifier. The apparatus further includes memory that at least temporarily stores information from the BPDU messages. The information includes an address of one or more network devices originating the BPDU messages comprising the same bridge identifier.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the present invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A system and method described herein are operable to identify an STP loop or instability in an Ethernet switching environment. As described in detail below, the system and method modify the conventional STP TCN BPDU or RSTP BPDU to assist in identifying the network device causing the instability or creating the loop in the network.

Figure 1:
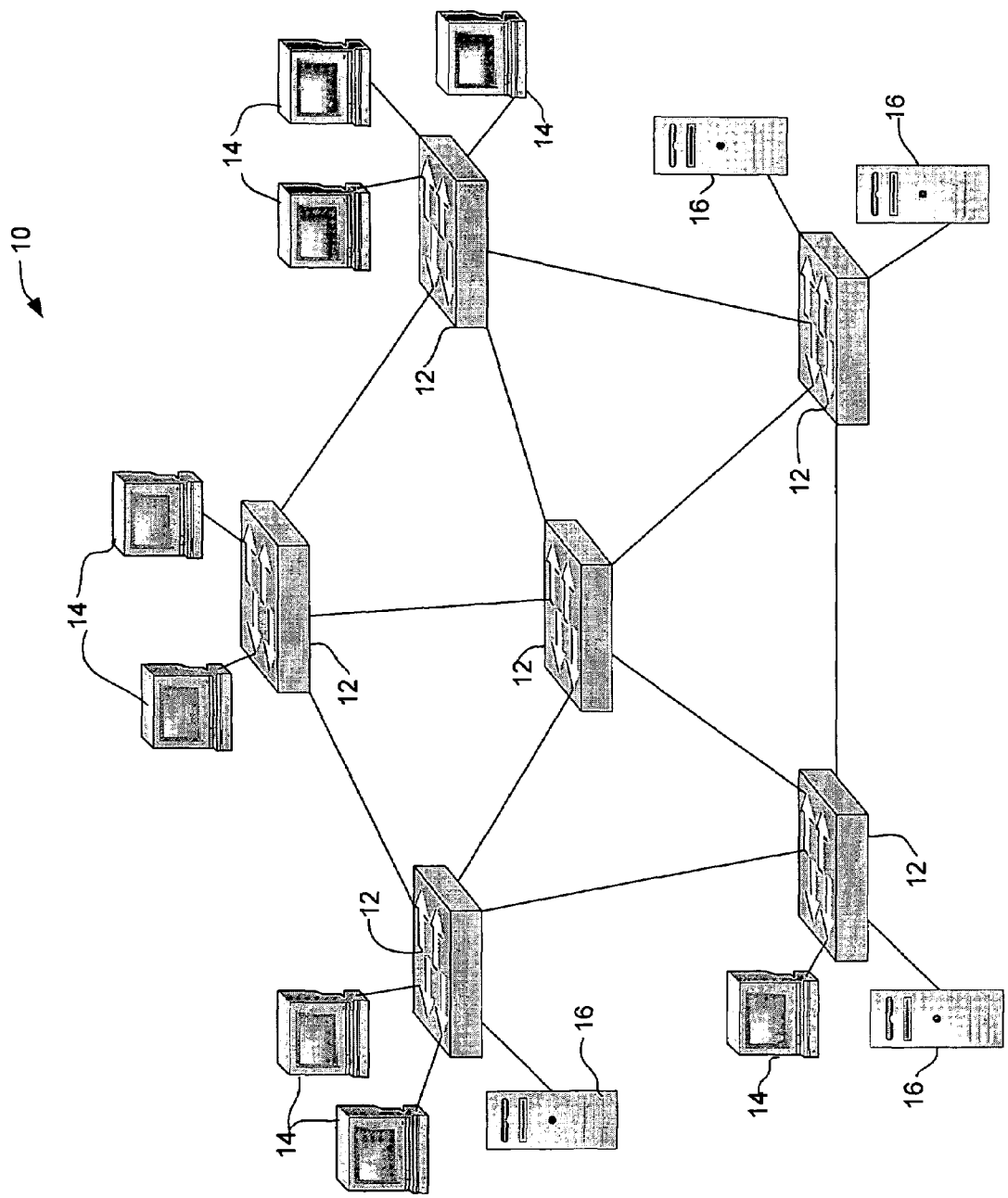
FIG. 1 illustrates a network in which embodiments may be implemented.

The system and method operate in the context of a data communication network including multiple network devices. A network device may be, for example, a network bridge, router, switch, or other such device. FIG. 1 illustrates an exemplary network 10 in which aspects of the application may operate. The network 10 includes switches 12 operably connected to each other by a series of links, which carry messages, such as data frames, between switches. End stations, such as client computers 14 and servers 16, are also connected to the switches 12. In one implementation, switches 12 may be Ethernet switches implementing a Local Area Network (LAN) or LAN segment. In accordance with the IEEE 802.1D standard, packets are typically transferred via a spanning tree constructed in accordance with Spanning Tree Protocol. All the nodes in the layer 2 network share a common understanding of the loop-free spanning tree.

It is to be understood that the network 10 shown in FIG. 1 is provided for illustrative purposes only, and that embodiments may operate in other networks having different or more complex topologies.

Upon start-up, each switch (bridge) initially assumes itself to be the root and transmits BPDU messages accordingly. The BPDU includes a header compatible with the Media Access Control (MAC) layer of the respective LAN standard and a message appended to the header. The header comprises, for example, a destination address (DA) field, a source address (SA) field, a Destination Service Access Point (DSAP) field, and a Source Service Access Point.

Upon receipt of a BPDU message from a neighboring device, its contents are examined and compared with similar information stored by the receiving bridge. If the information from the received BPDU is better than the stored information, the bridge adopts the better information and uses it in the BPDUs that it sends (adding the cost associated with the receiving port to the root path cost) from its ports, other than the port on which the better information was received. The identifier of the root is eventually propagated to and adopted by all bridges, allowing them to select their root port and any designated port. The root periodically transmits (e.g., every hello time) BPDU messages. A bridge creates a table, based on the information it receives, that associates to a port the MAC address of the host that can be reached through this port. Each bridge normally replaces its stored BPDU information every hello time.

The following describes operation of the network devices upon detection of a topology change to assist in identifying an STP loop or instability in the network. The following examples describe operation using STP and RSTP, as defined in IEEE 802.1D-2004, however, it is to be understood that other versions of STP may also be used.

Figure 2:
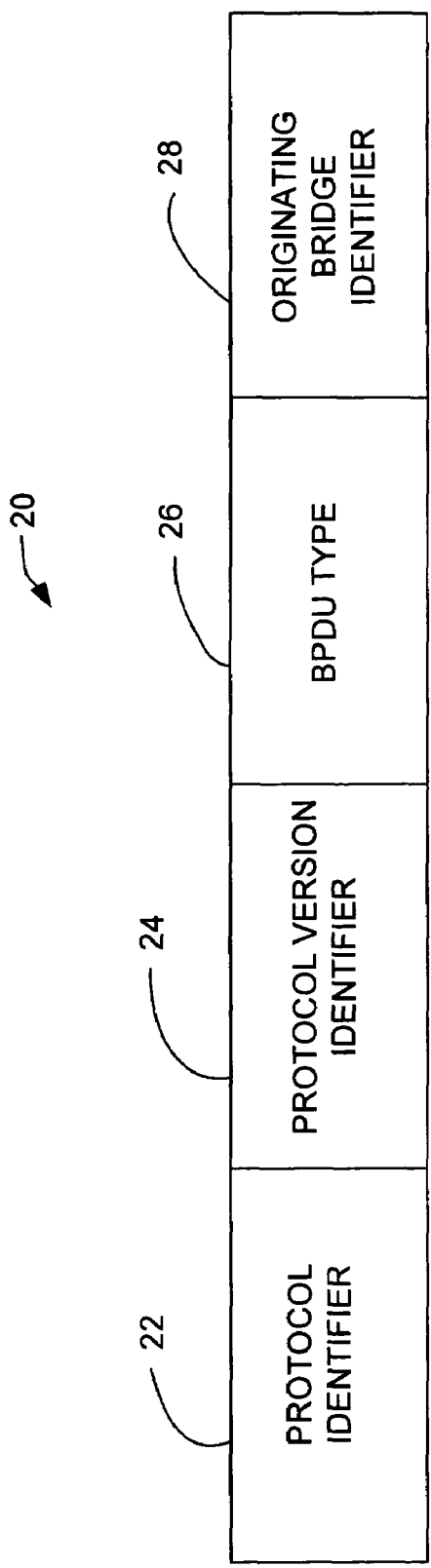
FIG. 2 illustrates TCN BPDU parameters in accordance with one embodiment.

For switches utilizing STP the standard TCN message is modified, as shown in FIG. 2. In addition to carrying the conventional protocol identifier 22, protocol version identifier 24, and BPDU type 26 fields, the TCN BPDU 20 also contains an originating bridge identifier field 28. The bridge identifier field 28 contains the identifier of the bridge sourcing (i.e., originating) the BPDU generated following a topology change. The TCN may also contain other fields of the standard STP Configuration BPDU, if additional information is desired to be collected at the root bridge. In one embodiment, the bridge identifier 28 is included in the message type field, which is currently padded for conventional STP TCN packets.

Upon detection of a change in active topology, an STP bridge begins transmitting TCN messages on its root port. The switch that first generates a TCN includes the bridge identifier (ID) of that switch in the TCN BPDU (field 28). An adjacent switch receives the TCN, acknowledges it, and generates another TCN for its own root port. When the switch generates its own TCN, it carries the originating bridge identifier (e.g., MAC address received in original TCN) in the originating bridge identifier field 28 of the TCN. All subsequent switches repeat the process until the TCN reaches the root switch. When the root receives the TCN, the TCN contains the bridge identifier which carries the MAC address of the first (originating) switch where the topology change was originally detected.

A record is maintained at the root bridge of the number of TCNs received, which can be shown by using a "show command". With this new TCN propagation scheme, the root bridge keeps a record of the number of TCNs received per MAC address in the TCN BPDUs. A TCN counter may be used at the root bridge to track the TCNs and corresponding MAC addresses of the originating devices. If a large number of TCNs are received at a root bridge an alert may be generated and sent to a system administrator or management station, for example. The information collected at the root bridge can be used to identify the source of the instability or loop in the network during troubleshooting. Network devices other than the root bridge may also keep track of the TCNs, however, it is preferred to track TCNs only at the root bridge since every bridge preferably passes information through to the root bridge.

The system is backward compatible in that, switches that do not understand the new TCN format silently discard all of the uninterested content and just look at the value up to Type 0X80 in the TCN BPDU.

Figure 3:
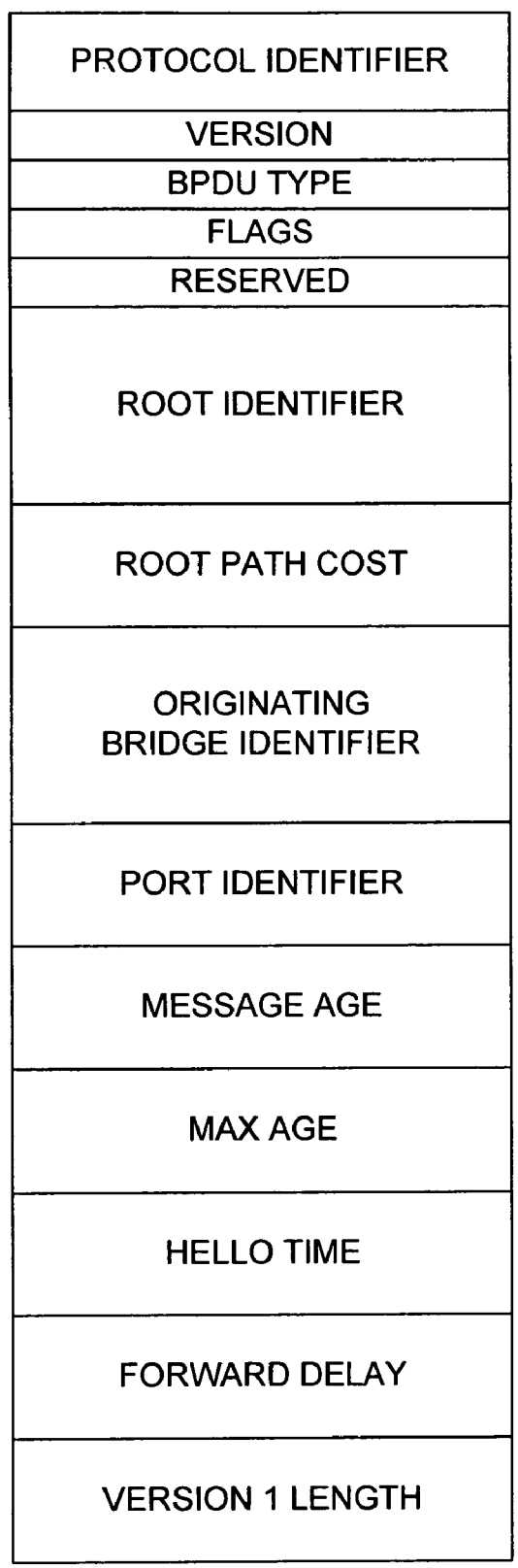
FIG. 3 illustrates RSTP BPDU parameters in accordance with one embodiment.

FIG. 3 illustrates an RSTP BPDU format in accordance with one embodiment. The BPDU message has a number of fields, including Protocol Identifier, Version, BPDU Type, Flags (including Topology Change, Topology Change Notification, Port Role, Learning, Forwarding, In Sync, and Topology Change Acknowledgement), Root Identifier, Root Path Cost, Originating Bridge Identifier, Port Identifier, Message Age, Maximum Age, Hello Time, Forward Delay, and Version 1 Length. In one embodiment, the BPDU format corresponds to the RSTP BPDU format defined in IEEE 802.1D, except that when the BPDU is sent for a topology change (TC flag set), the bridge identifier field contains the identifier of the bridge originating the BPDU, rather than the bridge sending the BPDU. The originating bridge is the same as the sending bridge for the first switch detecting the topology change and sending the first BPDU message with the TC flag set. For subsequent switches receiving the BPDU message, the originating bridge identifier is maintained in the bridge identifier field, rather than replacing the identifier with the switches own bridge (sending bridge) identifier, as is done in conventional RSTP implementation. As described above, the bridge identifiers are stored at the root bridge and a show command may be used to identify the switch causing instability.

Since the bridge identifier is being used to identify the originating bridge, it may not be available to be used as a tie-breaker, as described in IEEE 802.1D-2004. However, port identifiers may still be used as tie-breakers in decisions between spanning tree priority vectors that are equal in bridge identifier and root path cost.

Figure 4:
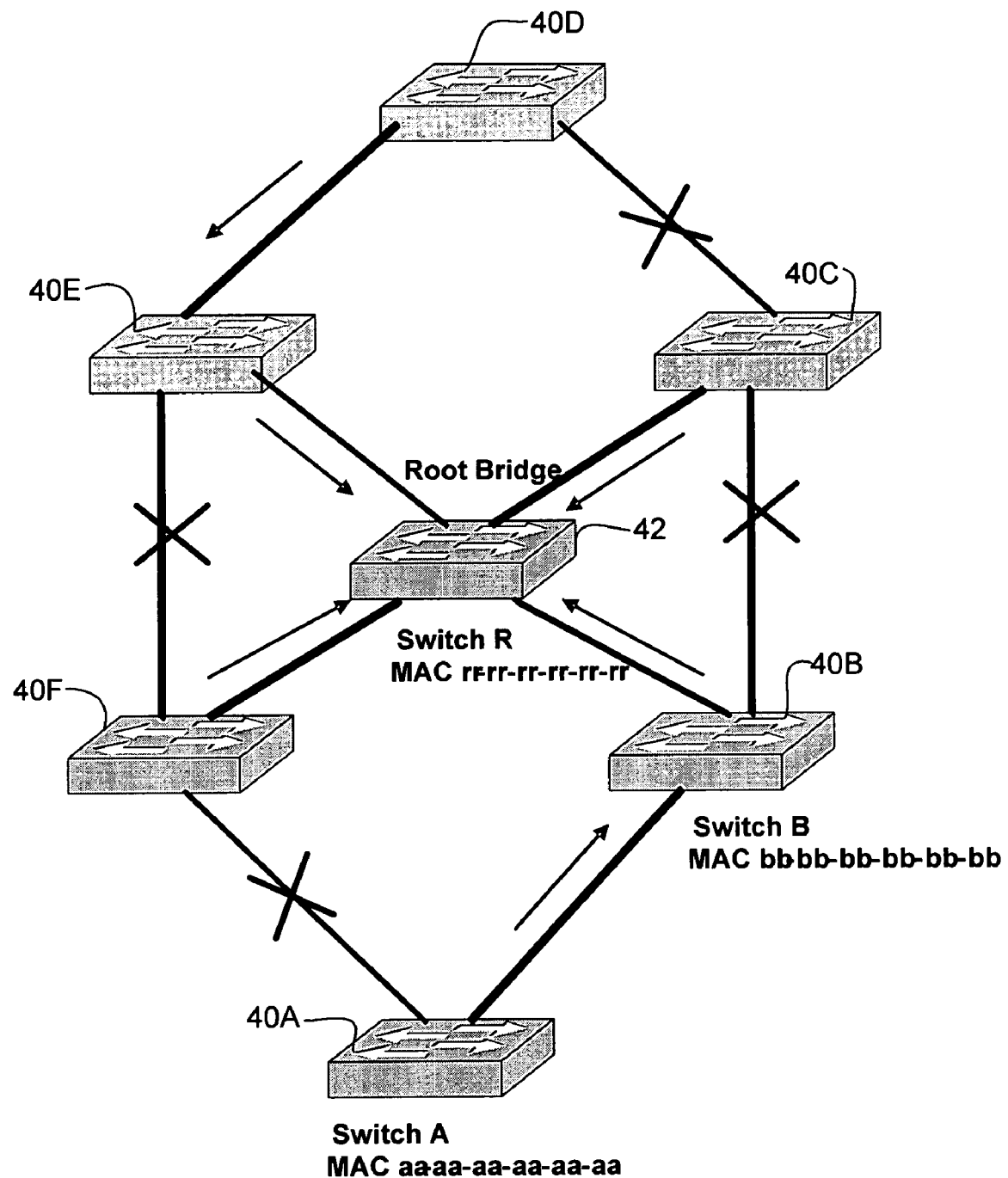
FIG. 4 illustrates a network in which a topology change has occurred.

FIG. 4 illustrates an example of identifying instability in a network using STP or RSTP. The network includes a root bridge (Switch R) 42 and a plurality of switches (40A (Switch A), 40B (Switch B), 40C, 40D, 40E, 40F). In a first example, the network is using STP. Switch A detects a topology change and generates a TCN, which includes Switch's A bridge ID (identifier) in the TCN BPDU (i.e., switch A priority and switch A MAC address aa-aa-aa-aa-aa-aa). Switch A sends the TCN BPDU to switch B. Switch B processes the TCN BPDU and sends it to the root bridge 42 while keeping the MAC address of the bridge ID from switch A in the TCN. In the case of an STP loop, additional TCNs are generated by switch A. The root switch keeps track of TCNs being received with the MAC address aa-aa-aa-aa-aa-aa of switch A. The problem can be quickly identified as being on switch A by performing a show command for TCN, which shows the number of TCNs per MAC address.

In a second example, the network utilizes RSTP. Referring again to FIG. 4, Switch A detects a topology change and sends a BPDU with TC flag set to switch B. Switch A sends its bridge ID (MAC aa-aa-aa-aa-aa-aa) as part of the BPDU in the bridge identifier field. Switch B processes the BPDU and sends it to the root bridge 42 with the value of MAC aa-aa-aa-aa-aa-aa in the bridge identifier field (rather than its own bridge identifier, as is done in conventional implementations). In the case of an STP loop, additional BPDUs with TC flag set are generated by switch A. The root switch keeps track of BPDUs being received with the MAC address aa-aa-aa-aa-aa-aa of switch A.

Figure 5:
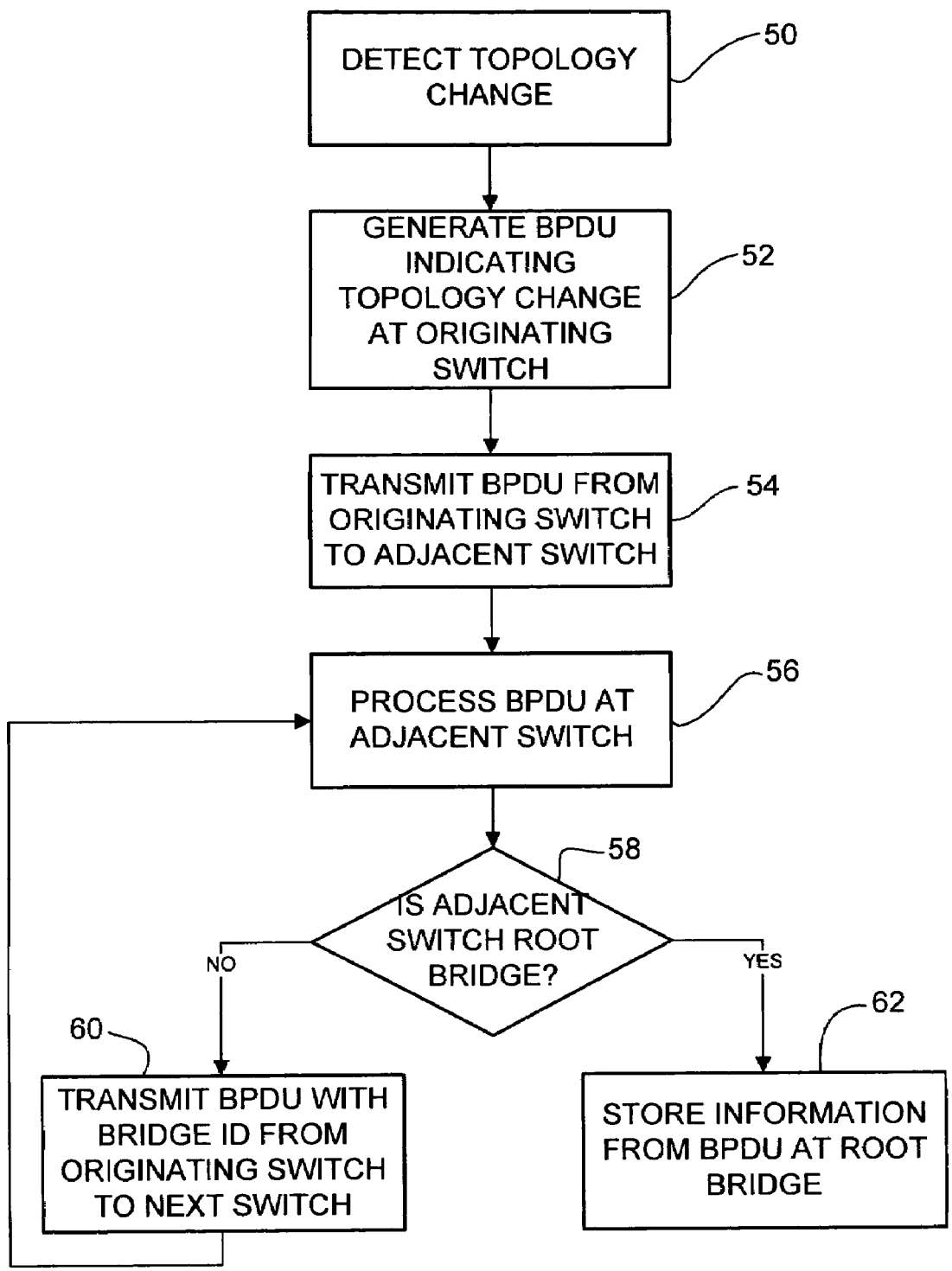
FIG. 5 is a flowchart illustrating a process for identifying a STP loop or instability.

FIG. 5 is a flowchart illustrating one example of a process for identifying an STP loop or network instability. At step 50, a first (originating) switch detects a topology change. The first switch generates a BPDU (e.g., TCN BPDU or RSTP BPDU with TC flag set) indicating a topology change (step 52). The first switch transmits the BPDU to an adjacent (second switch) (step 54). The second switch processes the BPDU (step 56). If the second switch is the root bridge it stores at least some of the information from the BPDU (e.g., originating bridge identifier) (steps 58 and 62) and continues normal STP or RSTP operation. If the second switch is not the root bridge, the switch transmits a BPDU with the bridge ID from the originating device to the next adjacent switch (step 60). This process continues until the root bridge is reached.

Figure 6:
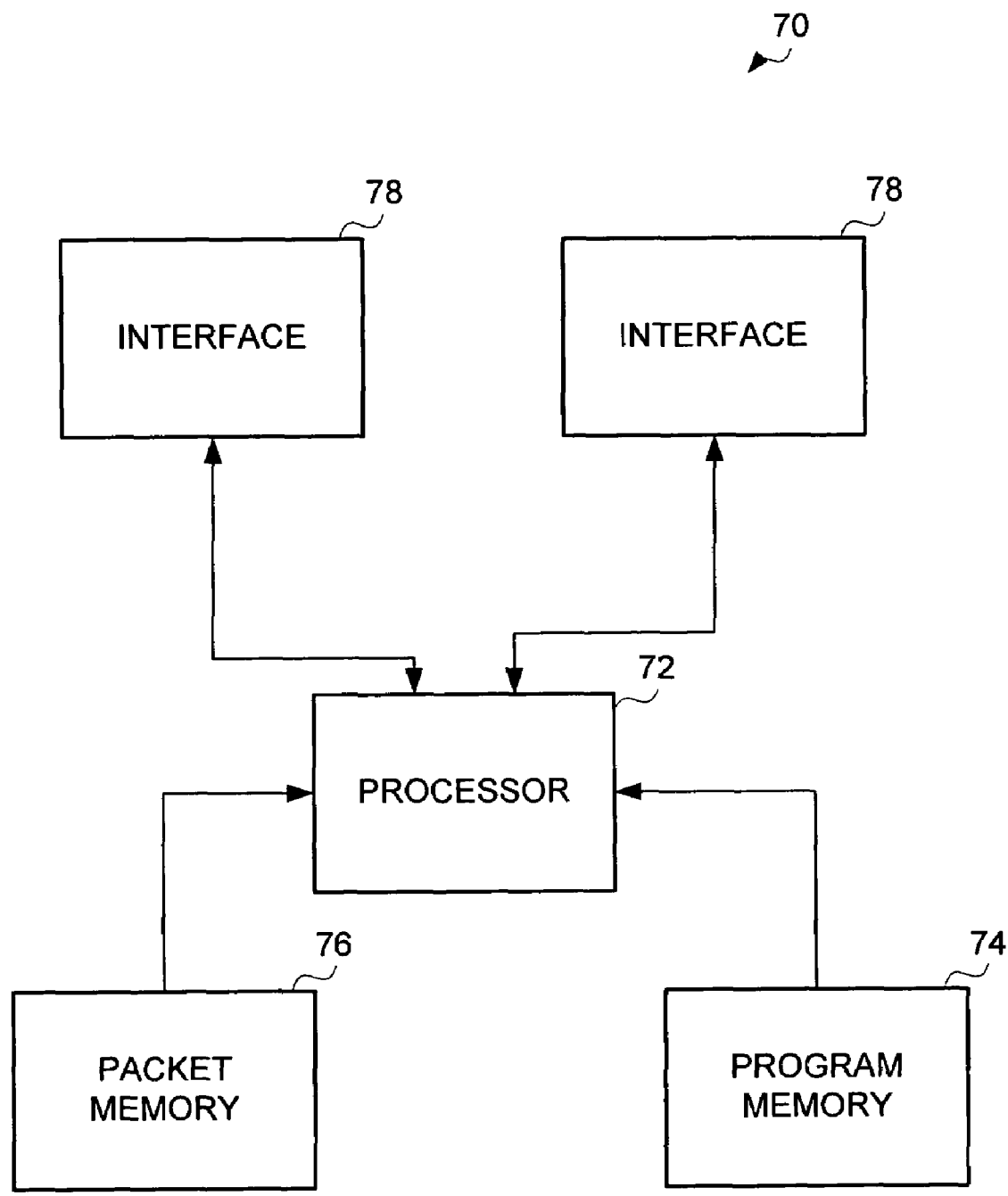
FIG. 6 illustrates a network device that may be used to implement embodiments.

FIG. 6 depicts a network device 70 that may be used to implement the method and system described above. In one embodiment, network device 70 is a programmable machine that may be implemented in hardware, software, or any combination thereof. A processor 72 executes code stored in a program memory 74. The code may control the operation of an operating system or one or more applications, for example. Program memory 74 is one example of a computer-readable storage medium. Program memory 74 can be a volatile memory. Another form of computer-readable medium storing the codes may be some type of non-volatile storage medium such as floppy disks, CD-ROMs, DVD-ROMs, hard disks, flash memory, etc. A carrier wave that carries the code across a network is an example of a transmission medium.

Network device 70 interfaces with physical media via a plurality of network interfaces 78. The interfaces 78 are typically provided as interface cards (sometimes referred to as "linecards"). Generally, they control the sending and receiving of data packets over the network and sometimes support other peripherals used with the network device 70. As packets are processed and forwarded by network device 70, they may be stored in a packet memory 76. Packet transmission operations may occur partially or completely within one of the linecards. The interfaces 78 generally include ports appropriate for communication with the appropriate media. To implement functionality according to the embodiments, linecards may incorporate processing and memory resources similar to those discussed above in connection with the network device 70 as a whole. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, and the like.

Network device 70 shown in FIG. 6 is only one example of a network device suitable for use with the embodiments. Other devices and systems having different configurations of subsystems may also be utilized.

As can be observed from the foregoing, the system and method described herein have many advantages. For example, by tracking the number of TCN BPDUs or RSTP BPDUs with topology change flag set at the root bridge, one can easily identify the location of the device in the network causing an STP loop or instability so that the problem can be quickly resolved.

Although the invention has been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method for identifying instability or a loop in a network, comprising:
    receiving at a switch a first Bridge Protocol Data Unit (BPDU) message indicating a topology change, said first message including a bridge identifier identifying a network device originating said first BPDU message;
    generating a second BPDU message at the switch, said second BPDU message comprising said bridge identifier identifying the network device originating said first BPDU message; and
    transmitting from the switch said second BPDU message indicating said topology change and comprising said bridge identifier identifying the network device originating said first BPDU message;
    wherein the switch and the network device are not root bridges.

2. The method of claim 1 wherein the BPDU is a Topology Change Notification (TCN) BPDU.

3. The method of claim 1 wherein the BPDU is a Rapid Spanning Tree Protocol (RSTP) BPDU with a topology change flag set.

4. A method for identifying instability or a loop in a network, comprising:
  receiving at a root bridge a plurality of Bridge Protocol Data Unit (BPDU) messages each indicating a topology change and comprising a bridge identifier identifying a network device originating a BPDU message upon detection of a topology change, at least a portion of said plurality of BPDU messages comprising the same bridge identifier; and
  identifying a source of the instability or loop by identifying the network device associated with the bridge identifier contained in a majority of said plurality of BPDU messages received at the root bridge.

5. The method of claim 4 wherein identifying a source comprises utilizing a show command to identify the number of TCN messages received at the root bridge from an originating network device.

6. The method of claim 4 wherein said BPDU messages are RSTP BPDU messages.

7. The method of claim 4 wherein said bridge identifier is a media access control address of the network device originating said BPDU message.

8. The method of claim 4 further comprising tracking TCN information at the root bridge.

9. The method of claim 4 further comprising:
  tracking the number of BPDU messages received per said bridge identifier; and
  generating an alarm if said number reaches a predetermined level.

10. An apparatus for identifying instability or a loop in a network, comprising:
  a processor; and
  a memory that stores instructions for execution by the processor, said instructions comprising:
    code that processes a first Bridge Protocol Data Unit (BPDU) message indicating a topology change, said first message including a bridge identifier identifying a network device originating said message; and
    code that transmits a second BPDU message indicating said topology change, wherein said second BPDU message comprises said bridge identifier identifying the network device originating said first BPDU message;
  wherein the network device is not a root bridge.

11. The apparatus of claim 10 wherein the BPDU is a TCN BPDU.

12. The apparatus of claim 10 wherein the BPDU is an RSTP BPDU with a topology change flag set.

13. An apparatus for identifying instability or a loop in a network, comprising:
  a processor operable to process at a root bridge a plurality of Bridge Protocol Data Unit (BPDU) messages each indicating a topology change and comprising a bridge identifier identifying a network device originating a BPDU message upon detection of a topology change, at least a portion of said plurality of BPDU messages comprising the same bridge identifier, and identify a source of the instability or loop by identifying the network device associated with the bridge identifier contained in a majority of said plurality of BPDU messages received at the root bridge; and
  a memory that at least temporarily stores information from said plurality of BPDU messages, said information including one or more addresses, each of said one or more addresses corresponding to said bridge identifier identifying the network device originating said BPDU message upon detection of a topology change.

14. The apparatus of claim 13 wherein said plurality of BPDU messages are TCN BPDUs and further comprising a TCN tracker configured to track said TCN BPDUs received at the root bridge and the address of the originating network device.

15. The apparatus of claim 13 wherein said BPDU messages are RSTP BPDU messages.

16. A computer program product for identifying instability or a loop in a network, said computer program product comprising:
  code that processes a first Bridge Protocol Data Unit (BPDU) message indicating a topology change, said first message including a bridge identifier identifying a network device originating said message;
  code that transmits a second BPDU message indicating said topology change, wherein said second BPDU message comprises said bridge identifier identifying the network device originating said first BPDU message; and
  a computer-readable medium that stores the codes;
  wherein the network device is not a root bridge.

17. An apparatus for identifying instability or a loop in a network, comprising:
  means for receiving at a switch, a first Bridge Protocol Data Unit (BPDU) message indicating a topology change, said first message including a bridge identifier identifying a network device originating said first BPDU message;
  means for generating a second BPDU message at the switch, said second BPDU message comprising said bridge identifier identifying the network device originating said first BPDU message; and
  means for transmitting from the switch said second BPDU message indicating said topology change and comprising said bridge identifier identifying the network device originating said first BPDU message;
  wherein the switch and the network device are not root bridges.

18. The apparatus of claim 17 wherein the BPDU is a TCN BPDU.

19. The apparatus of claim 17 wherein the BPDU is an RSTP BPDU with a topology change flag set.

20. An apparatus for identifying instability or a loop in a network, comprising:
  means for receiving at a root bridge a plurality of Bridge Protocol Data Unit (BPDU) messages each indicating a topology change and comprising a bridge identifier identifying a network device originating a BPDU message upon detection of a topology change, at least a portion of said plurality of BPDU messages comprising the same bridge identifier; and
  means for identifying a source of the instability or loop by identifying the network device associated with the bridge identifier contained in a majority of said plurality of BPDU messages received at the root bridge.

21. The apparatus of claim 20 further comprising means for tracking TCN information at the root bridge.

22. The apparatus of claim 20 further comprising:
  means for tracking the number of BPDU messages received per said bridge identifier; and
  means for generating an alarm if said number reaches a predetermined level.

* * * * *

UNITED STATES PATENT AND TRADEMARK OFFICE
CERTIFICATE OF CORRECTION

PATENT NO. : 7,609,658 B2 Page 1 of 1
APPLICATION NO. : 11/498599
DATED : October 27, 2009
INVENTOR(S) : Niazi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Twelfth Day of October, 2010

David J. Kappos
*Director of the United States Patent and Trademark Office*